Nov. 20, 1934.   J. J. WALLACE   1,981,575
CLEANER DRUM FOR COTTON GINNING MACHINERY
Filed March 27, 1933   2 Sheets-Sheet 1

Inventor
J. J. Wallace
By Mason Fenwick Lawrence
Attorneys

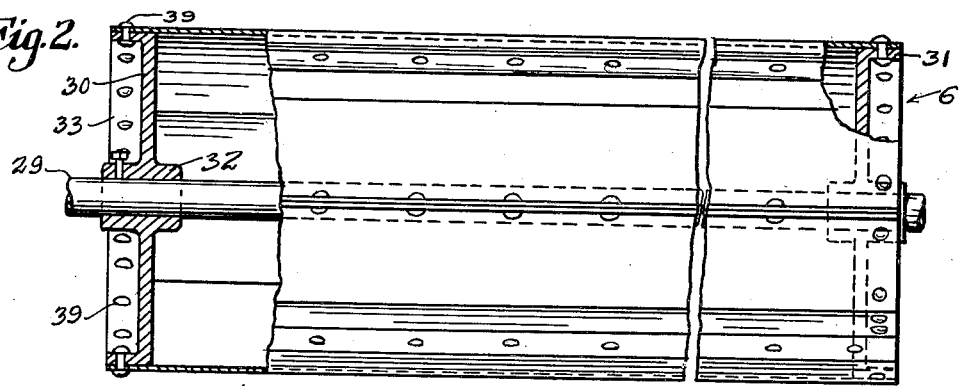
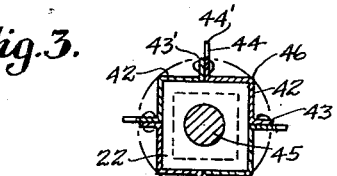
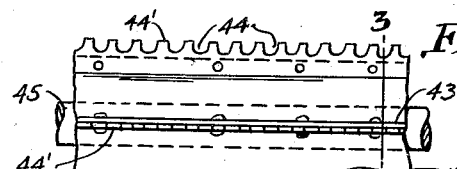
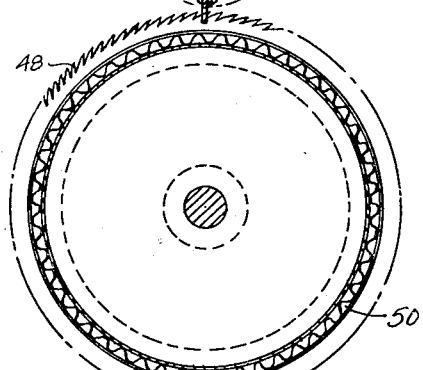
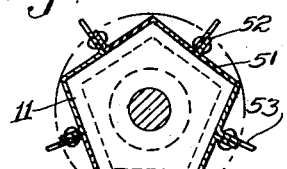
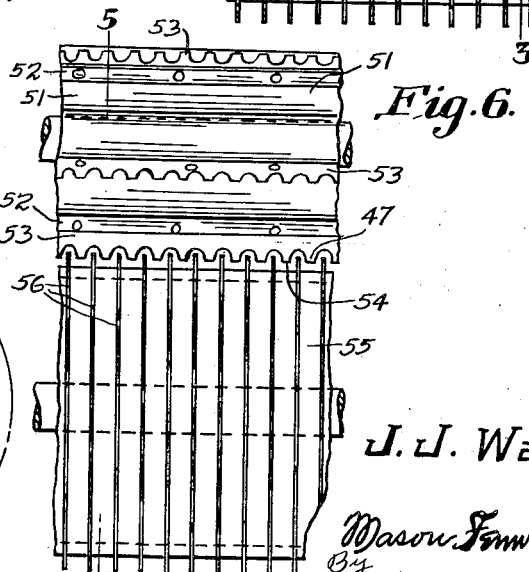
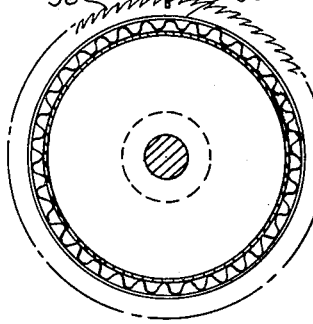

Patented Nov. 20, 1934

1,981,575

UNITED STATES PATENT OFFICE 1,981,575

CLEANER DRUM FOR COTTON GINNING MACHINERY

Jeffrey John Wallace, Amite, La., assignor to Gullett Gin Company, Amite, La., a corporation of Louisiana Application March 27, 1933, Serial No. 663,053

3 Claims. (Cl. 19—97)

This application is a continuation in part of my pending United States application, Serial No. 634,223, filed September 21, 1932 for an improvement on Cotton huller and cleaner.

The invention disclosed in this application relates to certain new and useful improvements in beater drums adapted for handling cotton in cotton gin feeders, hullers and cleaners, and the like; and has particular reference to an improved sheet metal drum intended for use in gin feeders for cleaning cotton and extracting the hulls therefrom.

The main object of the invention is to provide a metal drum of the type referred to which will be extremely simple and durable and which can be manufactured at very low cost.

Another object of the invention is to provide a drum adapted for use in combination with the saw cylinders of gin feeding apparatus to knock back hulls and other trash carried by the spaces between the saws.

Other objects of the invention will become apparent as the detailed description thereof proceeds.

In the drawings:

Figure 2 is a side elevation of one of several cleaner drums used in the apparatus shown in Figure 1, part of the drum being broken away and shown in section to illustrate details of construction;

Figure 3 is a central vertical section taken on the line 3—3 of Figure 4, through one of the beater drums combined with a saw forming part of said feeder;

Figure 4 is a fragmentary side elevation of the drum and saw combination shown in Figure 3;

Figure 5 is a central vertical transverse section, taken on line 5—5 of Figure 6, through a modified form of beater drum in combination with another of the saws forming part of the gin feeder referred to;

Figure 6 is a fragmentary side elevation of the combination illustrated in Figure 5.

Figure 1:
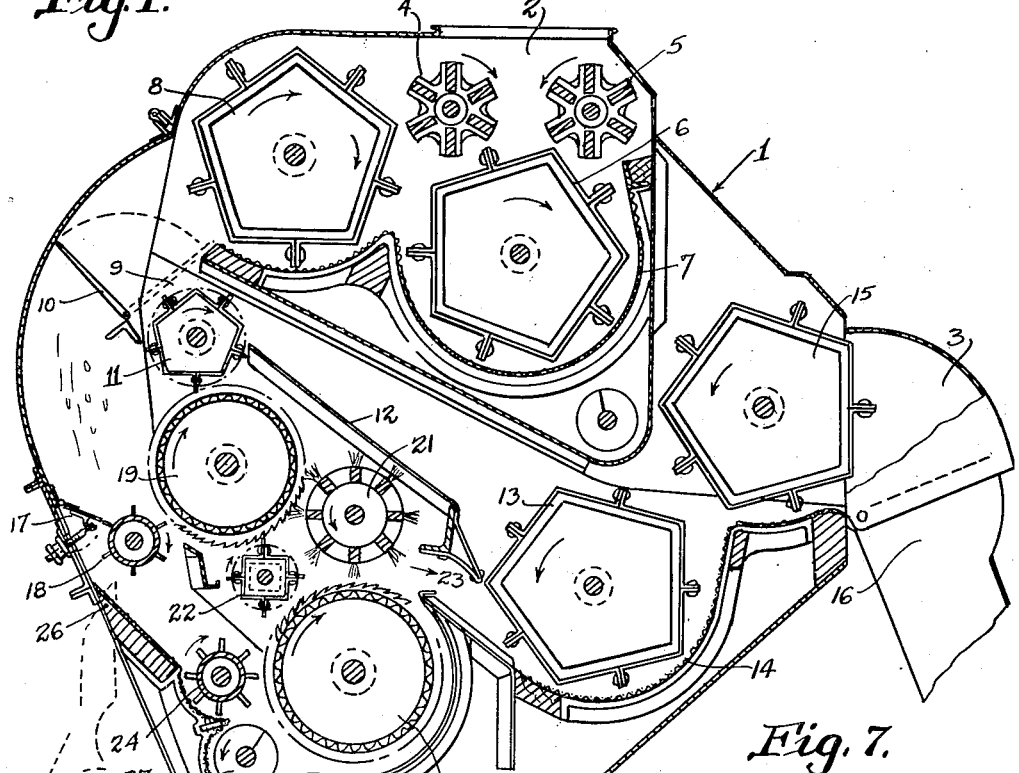
Figure 1 is a somewhat diagrammatic central vertical section through a cotton feeder of the type disclosed in my aforesaid pending application, and including modifications on several of the beater drums disclosed in said application.

As shown in Figure 1, the feeder in which the beater drums of the present invention are intended for use, comprises a casing 1 having an inlet 2 at the upper part thereof and an outlet 3 at one side of the casing 1. Immediately below the inlet aperture 2, a pair of feed rolls 4 and 5 conduct the seed cotton to a cleaner drum 6 which, in turn, conducts the cotton along a curved screen member 7 into contact with a second cleaner drum 8. The drum 8 passes the cotton along to a passageway 9, controlled by a valve 10, into the path of rotation of a beater drum 11 which moves the cotton onto an inclined slide 12 from which it is passed to a third cleaner drum 13. The drum 13 forces the cotton along a curved screen 14 into the path of rotation of a fourth cleaner drum 15 rotatably mounted in the mouth of the outlet 3, connected to a discharge spout 16.

The valve 10 is located, as shown in full lines in Figure 1, to effect direct passage of the seed cotton along the upper side of the beater drum 11 to the cleaner drums 13 and 15 leading to the outlet 3. This arrangement is used only when the cotton is comparatively clean and free from hulls. When the cotton is dirty and hully, the valve 10 is moved from the full line position to the dotted line position; thereby closing the passageway 9 and directing cotton from the cleaner drum 8 onto the hull board 17 and kicker 18.

The kicker 18 throws the hully cotton into contact with the upper saw cylinder 19, which carries it into the path of rotation of the kicker 11, the lower part of which is adapted to kick or throw back the hulls carried up by the teeth of the saw 19. A second saw cylinder 20 is rotatably mounted in the casing below the saw cylinder 19, and a doffing roller 21 doffs cotton from the saw cylinder 19 into the path of rotation of the beater drum 22 which also operates to knock back such hulls as may have been carried upwardly by the saw cylinder 20. The clean cotton is doffed from cylinder 20 by the doffing roller 21 into the passageway 23 leading to the lower side of the cleaner drum 13, and by drum 13 around the screen 14 to the drum 15 at the mouth of the outlet 3.

Figure 1 of the drawings illustrate a second kicker 24 adapted to throw such hully cotton as may have passed the kicker 18 onto the lower saw cylinder 20 which carries this cotton up into the path of the beater drum 22 to have the hulls knocked off before the cotton itself is doffed by the roller 21. A screen member 25 pivoted to the casing 1 to swing about the axis 26 encases the lower kicker 24 and a pair of endless conveyors 27 and 28 for conveying hulls and trash away from the machine.

The present invention is not concerned with the structural details of the general assembly illustrated in Figure 1, those details being described and claimed in my said pending application, Serial No. 634,223. The present invention is particularly concerned with the construction of the polygonal cleaner and beater drums or kickers adapted for use particularly with the saw cylinders of gin feeding apparatus. The cleaner drums 6, 8, 13 and 15 are illustrated and described in my aforesaid pending application. The beater drums 11 and 22 are also illustrated and described in said application so far as the greater part thereof is concerned, but the present invention includes an improvement in these beater drums, whereby certain of the flanged edges thereof are serrated to extend into the spaces between the saws of the saw cylinders to prevent hulls from being carried out between the saws. The hulls when soft and wet are filled with moisture and have a tendency to stick to the spacer blocks between the saws and to be thereby discharged from the feeder along with the cleaned cotton.

Figure 7:
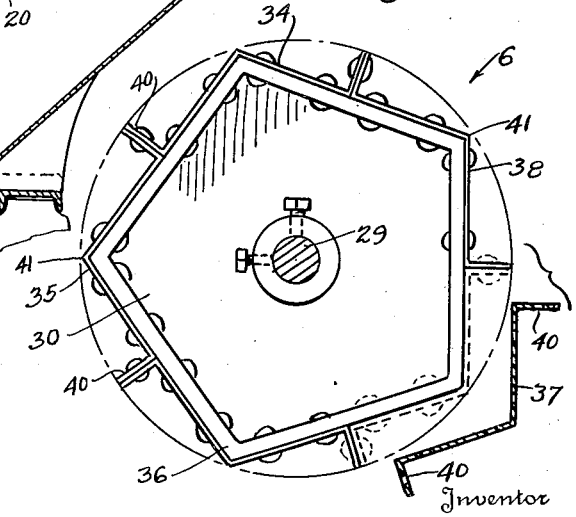
Figure 7 is a central transverse vertical section through one of the sectional cleaner drums illustrated in Figures 1 and 2.

Each of the cleaner drums 6, 8, 13 and 15 are identical in construction. It is therefore necessary to describe only one of them to disclose the inventive concept embodied therein. For this purpose the cleaner drum 6 is selected and is illustrated in Figures 2 and 7. The drum 6 comprises a shaft 29 adapted to be rotatably mounted in journals (not shown) suitably formed on opposite end walls of the casing 1 of the gin feeder. Polygonal end walls 30 and 31 are suitably secured in spaced relation to the shaft 29. Each of these end walls comprises a hub 32 and a flange 33 by means of which sheet metal plates which form the surface of the beater drum may be fixedly secured to the shaft 29. As shown in Figure 7, the end wall 30 is shaped as a regular pentagon, but the invention is not restricted to any particular number of sides. It is preferable, however, that in cross section, the drum have a section of that of a regular polygon. This is obviously necessary in order to secure proper balancing of the drum on the shaft 29.

As shown in Figure 7, the walls of the pentagonal drum 6 are formed by five similar sheet metal plates 34, 35, 36, 37 and 38 bent to fit over the corners of the flanges on the end walls 30 and 31. These sheet metal plates are suitably secured, as by rivets 39, to the flanges of the end walls 30 and 31. In order to secure the sheet metal plates to each other, the outer edges of each plate are turned up to form flanges 40 adapted to be riveted together so as to stiffen the whole beater drum assembly lengthwise. The outer edges of the flanges 40 are equidistant from the axis of the shaft 29, as are the corners 41 of each of the sheets 34, 35, 36, 37 and 38. By this construction, the corners 41 also serve to knock hulls and trash from the seed cotton in substantially the same manner as the flanges 40 formed on the edges of the sheet metal plates.

It will be evident from consideration of Figures 2 and 7 that the flanges 40 form a very strong reinforcement for the sheet metal plates which constitute the periphery of the cleaner drums. It will also be evident that the angular formation of the sheet metal makes a very strong joint at the polygonal corners of the drum. This means that the periphery of the drum can be made of comparatively light and inexpensive sheet material, and that these drums will be very durable as compared with the old type wooden drums, or other drums of the prior art in which spikes projecting from the drum surfaces are used to knock off the hulls from the seed cotton during its passage through the cleaner.

Exactly the same principle of construction is involved in the manufacture of the beater drums 11 and 22 shown in Figures 5 and 3 of the drawings respectively. In all of these drums, there are as many sheet metal sections as the polygon has sides. For example, in the pentagonal drums, shown in Figures 5 and 7, there are five similar sections. In the square drum shown in Figure 3, there are four similar sections, each of which is bent to fit the correspondingly shaped end walls, and each of which has flanges at its opposite edges bent up to be secured to and contact with similar flanges on the adjacent sections.

In the beater or kicker drums 11 and 22, however, one of the flanges of each section is made longer than the other. For example, in the square kicker drum shown in Figure 3, the section 42 has a flange 43 formed at one edge thereof and a wider flange 44 formed at the other edge. The edge 43' of the flange 43 is at the same distance from the center of the kicker shaft 45 as is the corner 46 of the plate 42. The wider flange 44 is serrated along its edge 44' so as to provide teeth 47 which extend into the spaces 48 between the saws 49 to knock off any hulls which might be carried in the spaces 48 formed by the blocks 50 spacing the saws 49 from each other.

The pentagonal kicker drum 11, shown in Figures 5 and 6, is constructed on the same principle as that shown in Figures 3 and 4. The only difference is that called for by the differences of the polygon angles between adjacent sides of the drum sections. For example, the plates 46 are bent so that the adjacent sides are arranged at an angle of 90° to each other, while the plates 51 of the pentagonal kicker, shown in Figure 5, must be bent at an angle of 108° to each other. Each plate 51 is provided at its opposite edge with a narrow flange 52 and a serrated wide flange 53, the wide flange 53 being serrated to provide teeth 54 to enter the spaces 55 between the saws 56 for the purpose of knocking off hulls which would otherwise be carried around by the saws along with the cleaned cotton. As shown in Figures 3, 4, 5, and 6, the serrations of the wider flanges 44 and 53 have their bottoms substantially flush with the edges of the narrower flanges 43 and 52, respectively.

It is thought that the invention and numerous of its attendant advantages will be understood from the foregoing description and it is obvious that numerous changes may be made in the form, construction and arrangement of the several parts without departing from the spirit or scope of my invention, or sacrificing any of its attendant advantages; the form herein described being a preferred embodiment for the purpose of illustrating my invention.

What I claim is:

1. In a cotton gin feeder, a drum comprising: a shaft, polygonal end walls spaced along and fixed to said shaft, a polygonal casing having its opposite ends secured to said walls, and flanges extending perpendicularly from the flat sides of said casing radially with respect to said shaft and between and substantially parallel to the corners of said casing, the free edges of said flanges and the corners of said casing being equidistant from the axis of said shaft.

2. In a cotton gin feeder, a drum comprising:

a shaft, polygonal end walls spaced along and fixed to said shaft, a polygonal casing having its opposite ends secured to said walls, said casing being built of similar sections equal in number to the number of sides in the polygonal end walls, each section being bent intermediate its edges to form faces adapted to contact with and be secured to said end walls, flanges projecting from the opposite edges of each section, and means for securing the flanges of adjacent sections to each other, the free edges of said flanges and the corners of each section being parallel to and equidistant from the axis of said shaft.

3. In a cotton gin feeder, the combination with a rotatable saw cylinder, a shaft rotatable about an axis parallel to the axis of the cylinder, a polygonal drum suitably secured to said shaft and having the corners thereof arranged to rotate in close proximity to the teeth of the saws during the rotation of said shaft, flanges projecting from the walls of said drum between the corners thereof and radially with respect to said shaft, said flanges being serrated to provide projections adapted to enter the spaces between the saws of said cylinder during the rotation of said shaft said corners and the bottom of each of the serrations in said flanges being substantially equidistant from the axis of said shaft.

JEFFREY JOHN WALLACE.